United States Patent [19]

Skinner, III

[11] Patent Number: 5,413,662

[45] Date of Patent: May 9, 1995

[54] ASSEMBLY OF CORRUGATED PANELS INTO A WEB AND MANUFACTURE OF PALLETS THEREFROM

[76] Inventor: Larkin P. Skinner, III, 3340-B Bee Cave Rd., Austin, Tex. 78746

[21] Appl. No.: 31,669

[22] Filed: Mar. 15, 1993

[51] Int. Cl.⁶ .............................................. B32B 31/00
[52] U.S. Cl. .................................... 156/263; 156/94; 156/264; 156/265; 156/266; 156/267; 156/269; 156/299; 156/300; 209/509; 209/659; 209/931; 108/51.1
[58] Field of Search ............... 108/51.3, 51.1; 493/964; 156/94, 264, 265, 266, 260, 263, 299, 300, 563, 558, 559, 560, 562; 209/3.1, 509, 659, 931

[56] References Cited

U.S. PATENT DOCUMENTS

| | | |
|---|---|---|
| 1,454,416 | 5/1923 | Tomlinson et al. ............. 108/51.1 |
| 3,733,235 | 5/1973 | de Ligt et al. ................... 156/260 |
| 4,230,049 | 10/1980 | Horne . |
| 4,390,154 | 6/1983 | Ostler et al. . |
| 4,411,420 | 10/1983 | Louis et al. .................... 271/197 X |
| 4,430,144 | 2/1984 | Osterman ......................... 156/497 |
| 4,435,237 | 3/1984 | Hoelzinger . |
| 4,467,728 | 8/1984 | Horne . |
| 4,500,381 | 2/1985 | Nordstrom ...................... 156/264 X |
| 4,792,325 | 12/1988 | Schmidtke . |
| 4,979,446 | 12/1990 | Winebarger . |
| 5,076,176 | 12/1991 | Clasen . |
| 5,083,996 | 1/1992 | Smith . |

FOREIGN PATENT DOCUMENTS

| | | | |
|---|---|---|---|
| 4031088 | 4/1992 | Germany ........................... 108/51.3 |
| 0558741 | 2/1975 | Switzerland ...................... 108/51.3 |

Primary Examiner—David A. Simmons
Assistant Examiner—M. Curtis Mayes
Attorney, Agent, or Firm—Bernard A. Reiter; Guy E. Matthews; J. Albert Riddle

[57] ABSTRACT

The invention comprises a method that utilizes a plurality of corrugated panels from used shipping containers to make a web that is then able to be cut into suitable shapes to be used in the construction of corrugated cardboard shipping pallets. The process begins with opening or flattening the used cardboard boxes and then removing the end flaps and opening along the manufacturer's seams to form a plurality of sheets. These sheets are then cut to form a plurality of sheets of uniform widths. A plurality of sheets of the same width are then assembled end to end and face to face, using an overlapping arrangement and a suitable adhesive, to make a multiple thickness corrugated web. This multiple layer web can then be cut by using suitable cutting techniques to make the components of corrugated cardboard shipping pallets. These components, or beams can be wrapped with a layer or layers of corrugated or other suitable material to add strength, moisture resistance or other desired qualities.

14 Claims, 4 Drawing Sheets

ASSEMBLY OF CORRUGATED PANELS INTO A WEB AND MANUFACTURE OF PALLETS THEREFROM

This invention relates generally to recycling of cardboard boxes and to manufacturing items from flat thick corrugated sheeting, slabs or beams, such as furniture and other light structural items. The invention also relates to the manufacture of shipping and storage pallets out of recycled used corrugated board. The invention is most particularly concerned with methods of reducing a variable starting material to a constant raw material and methods for assembly of the constant raw material into a finished product by tiling and sorting.

BACKGROUND AND PRIOR ART

Today there is a strong demand for a recyclable pallet or method of constructing a pallet from recycled materials. From a functional standpoint, the conventional wooden pallet is difficult to improve upon, however, when damaged or at the end of its life span (usually about five trips) disposal is difficult. Conventional pallets are bulky and take up a lot of landfill space; they cannot be burned easily because contaminants may have become embedded in them. If wooden pallets were made of standard modular sizes, recycling would be easier, but goods are not made with the sizing of pallets in mind. A specific weight range/cost range/durability range of nonstandard pallet size is required for many goods. The market is filled with a great many and great variety of pallets not at the end of their wear span but also not very valuable.

Prior art U.S. Pat. Nos. 4,230,049, 4,390,154, 4,467,728, 4,979,446, 5,076,176 and 5,083,996 to Horne, Ostler, Horne, Winebarger, Clasen and Smith, respectively demonstrate the existence of the problems in the industry. Each of these references is hereby fully incorporated by reference for all disclosed. The invention disclosed herein has the additional goal of recycling used material.

The Ostler patent discloses the use of a two-ply corrugated paperboard pallet deck and in which the use of the plies are arranged so that the corrugation in one ply is perpendicular to the corrugations in the other ply. Winebarger shows a corrugated pallet wherein each component of the pallet is constructed from creased and scored rectangular blanks molded to comprise a solid core of adjacent vertically oriented panels surrounded by an outer covering of parametric horizontally and vertically running panels. Clasen and Smith are both directed to pallet assemblies. The Clasen patent shows a low cost, structurally stable pallet or cargo shipping surface composed of elements which are made of layered and bonded cardboard material. The Smith patent discloses a disposable assembly using cylindrically reinforcing pieces which are engaged with stringer members. None of these references addresses the dual problems of economics and the environment.

Recycling is desirable both ecologically and economically, and in the future may actually be a requirement. Currently, landfills are 48% disposed paper. Of that fraction a substantial percentage is disposed corrugated board. Much corrugated board contains the maximum recycled content for its specific usage. The total number of trips a given volume of kraft paper obtains, even with recycling, is very low. A method of gaining additional use out of a given volume of corrugated between recycling trips will significantly affect the total volume of disposed corrugated that is landfilled.

While there is demand for a highly recyclable pallet, there are serious cost limitations imposed. Increasing the cost paid for pallets does not improve the value of goods shipped upon them. In other words, increasing the cost for pallets directly effects profit. Various systems for continuous manufacturing of pallets out of new corrugated board suffer from a serious limitation. It takes roughly 100 to 150 square feet of corrugated board to make a structural pallet which can withstand 1800 to 2500 pounds dynamic capacity. At $0.05/square foot for raw material costs are in the $5–7 range per pallet. This is equal to the finished cost range for new wooden pallets. Without a substantial cost improvement, corrugated pallets will never catch on.

SUMMARY

The invention comprises a method that utilizes a plurality of corrugated panels from used shipping containers to make a web that is then able to be cut into suitable shapes to be used in the construction of corrugated cardboard shipping pallets. The process begins with opening and emptying the initial contents then flattening the used cardboard boxes and shipping them to a recycler. The process continues with removing the box end flaps and opening along the manufacturer's seams, and in some cases removing other irregularities such as folds, to form a plurality of sheets. These sheets are then cut to form a plurality of sheets of uniform widths. This step of the process provides tiles or sheets of several fixed uniform widths. A plurality of tiles or sheets of the same width are then assembled end to end and layered face to face, using an overlapping arrangement and a suitable adhesive, to make a multiple thickness corrugated web. This multiple layer or laminated web can then be cut by using suitable cutting techniques to make the components of corrugated cardboard shipping pallets. These components, or beams can be wrapped with a layer or layers of corrugated or other suitable material to add strength, moisture resistance or other desired qualities.

DESCRIPTION OF THE DRAWINGS

FIG. 14 is an illustration of a wide sheet of laminar web assembled from the interlocking tiled panel components of FIG. 13a.

DETAILED DESCRIPTION OF THE PREFERRED METHOD AND APPARATUS

The invention will now be described with reference to the accompanying figures. This invention discloses a process (FIGS. 1 and 1a) and assorted apparatus (FIGS. 2 through 8) for manufacturing a structural component from recycled corrugated cardboard, bonded layer to layer, and cut into a finished shape. The structural components can be assembled into end products such as heavy duty sheet or top deck, shipping pallets or furniture. Such a structural component, a beam (FIG. 10) for use as a component of a shipping pallet (FIG. 11) for example, needs to withstand large forces downward upon the flutes (the strongest dimension of corrugated). The layers need to be adequately bonded layer-to-layer to avoid torsional failure. The laminar web built up from the bonded layers needs to have adequate gluing and spacing of joints so that it does not have areas of weakness (below a given standard) which would be invisible sources of failure. It needs to be built in a fixed thickness and in a continuous web which can be cut to appropriate length and height. Control over the variations in thickness are necessary to allow control over the gluing and notching process to form the final frame.

Figure 1A:
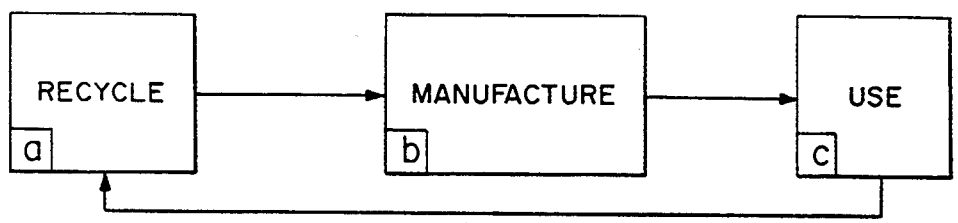
FIG. 1a is a flow diagram of the invention in broader perspective illustrating the recyclability of the product into raw material for further recycling.

As shown in FIG. 1a, and described elsewhere in this specification, new corrugated cardboard containers are currently flattened by the end user and returned to be recycled (by bailing milling and breakdown into pulp) into new containers. The rate of return/recycling currently r, FIG. 1a is approximately 30%. This invention, a,b,c of FIG. 1a will increase the recyclability or return by an anticipated 30%. s, FIG. 1a.

The invention utilizes as raw material recycled corrugated cardboard, for example used cardboard boxes or shipping containers. The use of such material achieves the twin goals of recycling previously used cardboard to reduce landfill bound waste, and provides an inexpensive and thus cost competitive material source. These twin goals are achieved at the cost of dealing with a highly variable material. Used corrugated boxes are a poor source of a fixed starting material. They are contaminated with case closing glues and tape. They are often torn, crushed or structurally damaged. Currently, they are crushed and bailed. Then they are shipped to a corrugated mill and ground up. Glue and contaminants are floated off in a wet separation process. Paper is then remade in a conventional paper making process. This invention solves the problem with a process step of gaining a fixed variable width which to start. The corrugated panels then can be recycled directly into another usage. When the components are finally damaged or used too badly for further use, they can be recycled as in FIG. 1a, from c to a.

Figure 1:
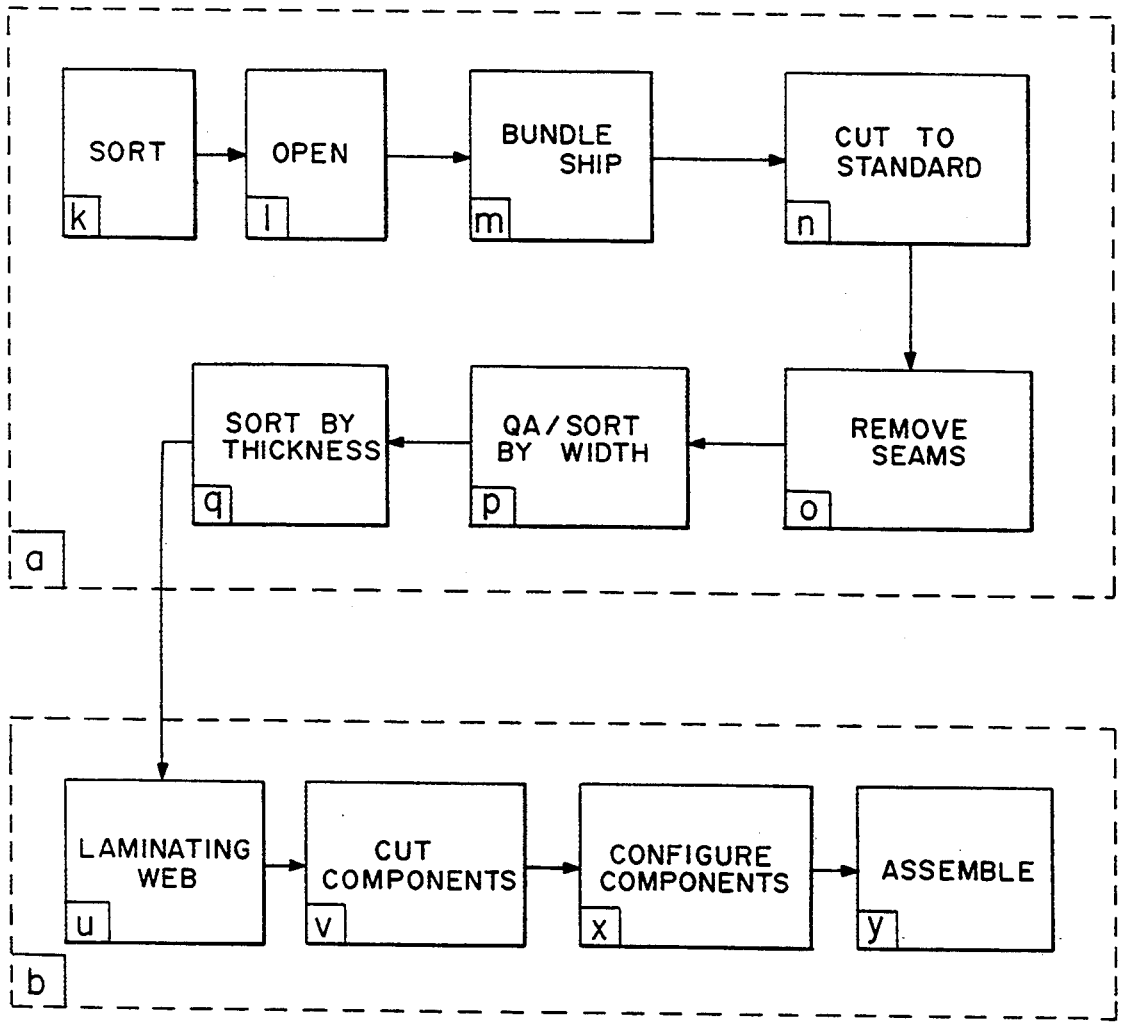
FIG. 1 is a flow diagram of the process steps of the invention.

Referring now to the figures, and specifically to FIG. 1, the process starts with corrugated boxes, as they are emptied at the user (grocery store etc.) and recycled a. Irregularities such as the box flaps are separated to allow the box to be flattened or the box flaps are removed at the store to allow flat stacking. The box is either handled so as not to lose the structural integrity of the board or an initial sorting step k is used to select suitable boxes. Flattened 1 and strapped on a pallet m, the boxes are shipped to the facility for manufacture b of product and then on to the end user c. Some variation in these initial steps is possible, for instance the flattened boxes may initially appear at a recycler for certain steps and then be transferred to a pallet manufacturer.

Figure 2:
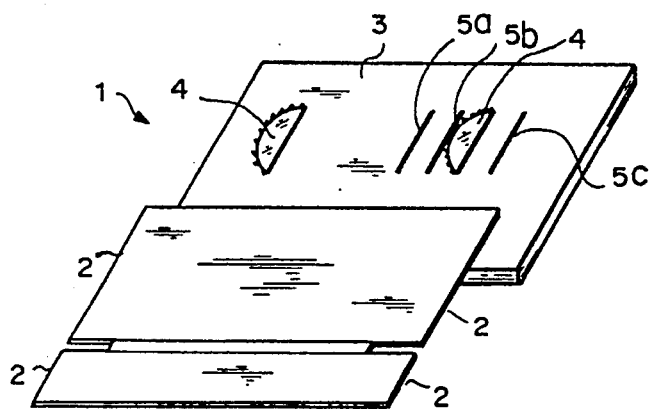
FIG. 2 is an illustration of an apparatus for the step of cutting the recycled corrugated component to standard length panels.

Referring to step n of FIG. 1 and to FIG. 2, a parallel slitter machine 1 is used to remove irregularities such as both top and bottom flaps 2 and leave the sidewalls. The apparatus illustrated provides a table surface 3 for handling the boxes and two parallel cutting tools 4, which are rotating circular saws in this primary embodiment. Other cutting implements or machine configurations may also be suitable. If the corrugated is to become an edge-on structural beam it is important to remove irregularities like all of the slots for or folds of the flaps 2. This would not be as important if making a wide multiply sheet. Removing the flaps 2 also eliminates much tape, label and glue contamination.

The slitter machine table 3 is provided with adjustments for the distance between the two saws. In the table illustrated one saw is fixed and the other adjustable to fit within openings 5a 5b 5c through the table top. The adjustment can be by any suitable means, in the invention disclosed it is envisioned that the adjustable cutter can be mounted to a foot pedal control for actuation an extruding retracting mechanism to allow quick adjustment. The purpose of the adjustment provision is to allow for the cutting of several fixed width panels, for example 12",15",18",21" to standardize widths for webs.

Figure 3:
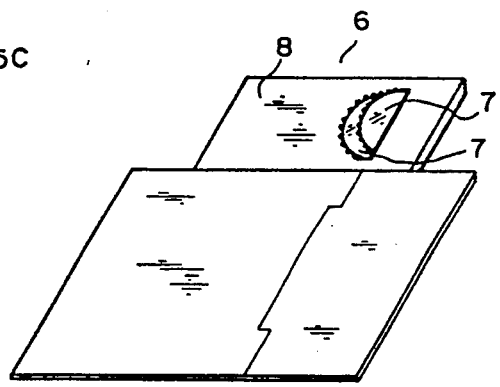
FIG. 3 is an illustration of an apparatus for the step of removing irregularities from the panels cut in FIG. 2.

Next, as in FIG. 3 other irregularities like all manufacturer's seams are removed from the panels by a double blade saw 6 or other suitable device, or manually. This is step o of FIG. 1. The apparatus 6 illustrated provides two rotating circular saws 7 mounted on an arm 8 to make a perpendicular cut 46 removing the manufacturers seam 47, turning the belt or band shape 48 (from a box with the flaps removed in the previous step) into a flat sheet. As shown in FIGS. 2 and 3 the cuts made by the saw 6 are perpendicular to those of saw 1 and leaves a panels of a fixed preselected width(s), variable thickness, and variable length.

Figure 4:
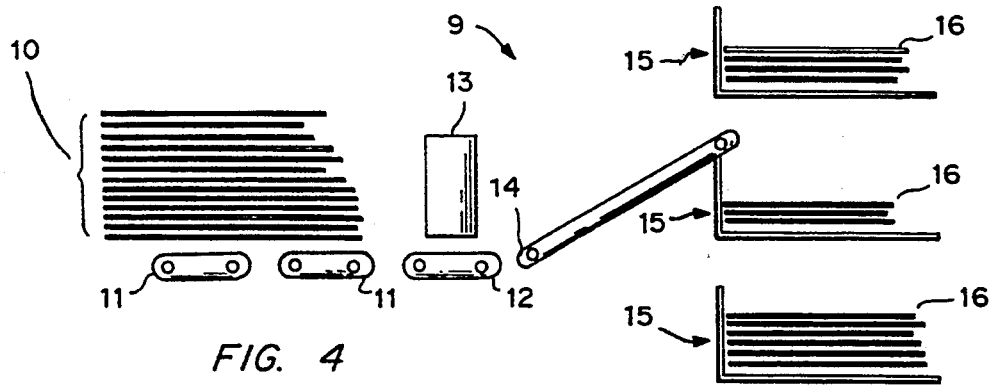
FIG. 4 is an illustration of an apparatus for the step of sorting the panels by thickness.

Manual or automatic inspection and sorting at this point (steps p and q, FIG. 1 and FIG. 4) provides a more constant starting raw material for the manufacturing line to be described below. Sidewalls of boxes are generally in better condition and can be segregated for more demanding applications by manual inspection or appropriate automated scanning. FIG. 4 illustrates an apparatus 9 for sorting the panels 10 by thickness. The relative thickness of panels 10 in any given layer must be relatively constant to avoid bridging weakness leading to failures. Bridging weaknesses occur when a thick sheet butts to a thin sheet forcing the next layer to bridge over the height variation. FIG. 4 depicts the unsorted stock 10 which is carried to the thickness sorting apparatus 9 by rollers 11 or other means such as conveyers (not shown). These rollers may be gravity driven or powered depending upon the dictates of the manufacturing line of any given facility. The roller 12 is situated below a thickness sensor or measuring device 13 which by microprocessor or other means orients a conveyor 14 to deposit each panel to a storage bin 15 for a given thickness within a given tolerance range.

The Recycling step a of FIG. 1 is complete upon the deposit of the thickness sorted panels of constant width 16 into the bins 14. Providing this much improved, though variable, starting material is the first step, in the broad view, of this invention, as is removing as much variation as possible from this raw material. FIG. 1a step a, and FIG. 1 step a and steps k through q.

Referring now to FIG. 1a step b, FIG. 1 steps u v w and x, and to FIGS. 5 through 8 the manufacturing of the laminated web will be described. The corrugated panels prepared in the previous steps are glued in a continuous web of variable thickness. The final thickness of the web must be controlled. There must be sufficient overlap of the panels in one layer over joints in any adjacent layer to avoid forming an internal weakness within the beam. Depending on the type of glue, the amount of compression and duration under compression is important to the process design, but these variables can be selected to achieve the manufacturing goals and design strengths needed by means known in the art.

Although improvements might be realized by further automation, which is considered to be within the scope of the present invention, the preferred enabling embodiment of the present invention for manufacturing a web on a continuous-production machine will now be described Two alternative embodiments of this machine are disclosed. 17 and 31 FIGS. 5 and 6. FIG. 1 step u.

Figure 5:
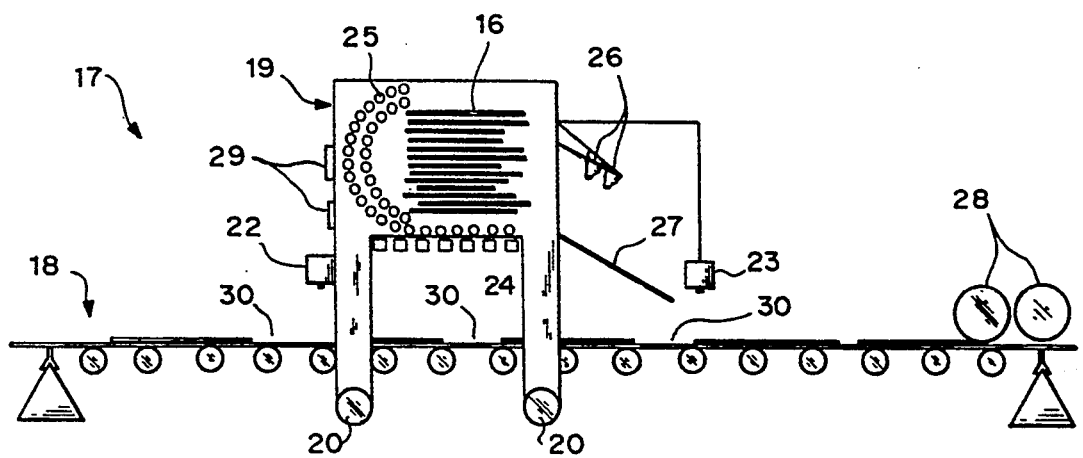
FIG. 5 is an illustration a first embodiment of an apparatus for the step of laying the panels into a laminar web.

Referring to FIG. 5, a cross section, a wide flat conveyor 18 is used to lay down the first layer of panels end-to-end without glue for some convenient length. Panels are dispensed from a moving trolley 19 that straddles the conveyor 18. Trolley wheels or bogeys 20 permit the dispensing apparatus 19 to move up and down the length of the conveyor 18. The trolley 19 is provided with bins or a bin 21 for the panels 16 which are of constant width, and sorted fixed thickness and variable length. Measurement sensors can be provided as at 22 and 23. Sensor 22 identifies gaps on the lower layer and sensor 23 identifies the end of the previous sheet. Sensors 24 within the bin 21 determine the length of the internal panels, and if the panel is not of the proper length, the panel is returned to the top of the bin 21 by a panel return 25 or trimmed by shear 29, as will be explained below. Glue guns 26 are disposed to automatically and evenly coat panels as they are dispensed at 27 with the proper amount of adhesive of the correct type for the application. A press roller or press rollers 28 are provided and integrated with the apparatus to travel the length of the conveyor 18 as needed to apply pressure to assist in bonding the layers of panels one to another. A shear or trimmer 29 is mounted to the trolley 17 for adjusting the length of panels 16 to correctly match gaps and overlap joints 30 in previous layers.

Sheets or panels 16 are dispensed with glue already applied to one side only. The length of the panels varies randomly. Manually, an operator could dispense with actual measurement of the length of the panels and work by eye. Automatically, measurement would be essential. For example, in the event the first panel, second layer, overlaps the joint in the layer below it by the specified margin, which is 4" either side of the joint on the layer below (a primary enabling and illustrative embodiment and not a limitation), if the second panel's length falls within the prohibited overlap zone, the operator will have to choose a sheet of a different length or trim a panel to fit. Manually, it might be easier to trim or nibble the excess length with a conveniently located shear 29. This overlap process will continue layer by layer until the desired total web thickness is reached. Then the conveyor 18 would be actuated, the web moved into the compression section of the machine (top and bottom flat conveyors) and the operator would start building another section of the web. At the end of the compression section, the web is cut to convenient length, stacked and stored under compression to cure. There may in appropriate cases be several stations where only a portion of the thickness of the finished web is completed before it enters a compression section and then to another operator's station.

In the automated line illustrated in FIG. 5 the selection of the length of panel is done automatically, the shearing of the panels as needed can also be triggered automatically, and press rollers 28 can replace the steps of moving the web in and out of the compression section between layers. Numerous variations on combinations of manual and automated steps during the laminating of the web will be apparent to those of skill in the art in view of this disclosure, all are considered to be within the scope of the invention.

Figure 6:
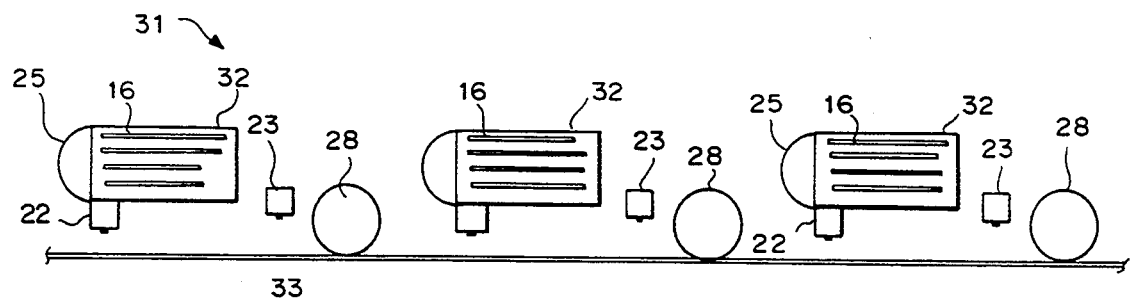
FIG. 6 is an illustration a second embodiment of an apparatus for the step of laying the panels into a laminar web.

FIG. 6 illustrates an alternative configuration for the web laminating line and apparatus 31. This embodiment 31 comprises a fixed trolley and moving web. A series of fixed "trolleys" 32 is fixed and a conveyor belt 33 moves the web along the laminating line beneath each trolley 32. The same sorting and trimming process steps described above for the moving trolley embodiment of FIG. 5 guarantees proper overlap at each joint and correct panel length. Gap sensors 22 and lay point sensors 23 perform the same function as in the apparatus 17, as do the press rollers 28. Each laying station or fixed trolley in this embodiment could contain a different thickness panel.

One problem arises as the operator, or machine, builds layer by layer. In the usual case the thickness of the panels in individual layers has varied randomly. If the panels were not sorted for thickness at all, in practice this would mean that thickness variation would often statistically cancel out, however, sometimes it would either add or subtract in an unpredictable manner. If a web were layed up by number of layers, for example 8 layers thickness might easily vary by 10-25% and up to 50%. The end product of the present invention requires instead building to a specified thickness tolerance (for example 2" plus or minus 1/16"). Even though rough sorting of the panels will control this problem somewhat and make the job easier, the required tolerances mandate a supply of over-thick or over-thin panels to select the final layers' thicknesses to arrive at the specified size within the specified tolerance. The panels are sorted by the step and device of FIG. 4 and thus it is possible to use specific thickness for any given layer to arrive at the desired end thickness. Multiple bins 21 can be mounted to the trolley and specific thicknesses selected for each layer, or bins could be interchanged to apply the selected thickness for each layer.

Figure 12:
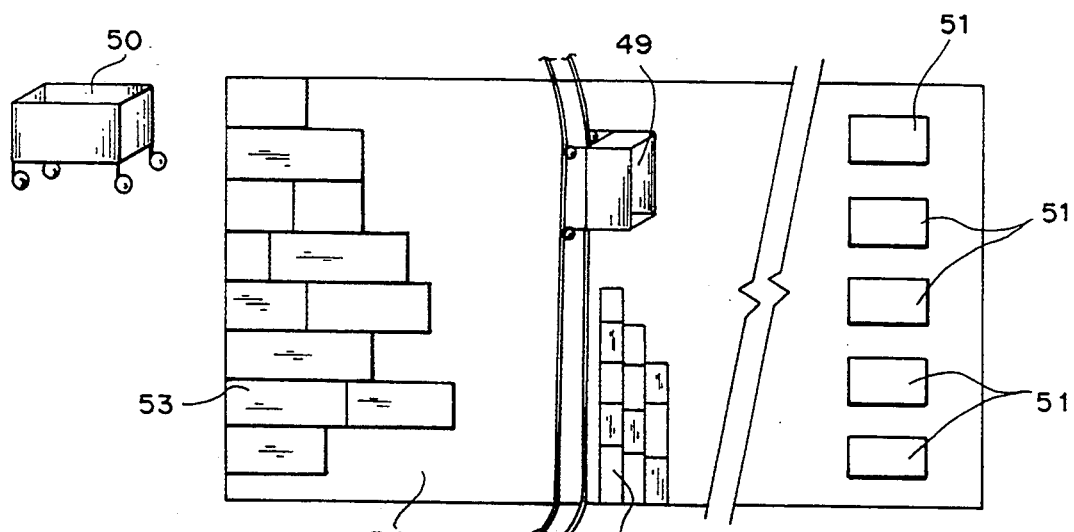
FIG. 12 is an illustration of apparatus for manufacturing a wide sheet of continuous laminar web.
Figure 13:
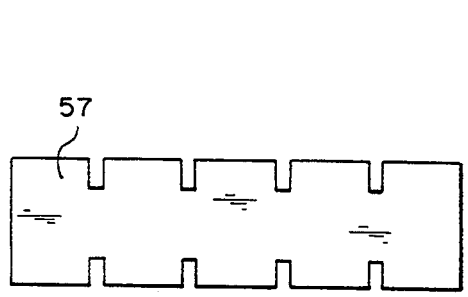
FIG. 13 is an illustration of an apparatus for forming an interlocking panel shape from the recycled corrugated components.
Figure 14:
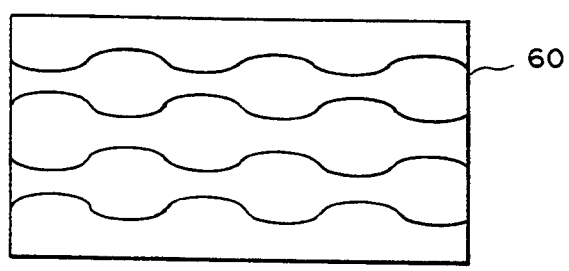

FIGS. 12 through 14 illustrate further variations of the invention. FIG. 12 illustrates a process manufacturing line and apparatus for manufacturing a wide sheet laminated web. The foregoing description applies with the modification of using multiple trolleys 49, 50 or fixed bins 51 which lay tiles or panels both perpendicular 52 and parallel 53 (respectively for the illustrated trolleys) to the length of the web 54. The trolleys work in the previously describe manner similar to those of FIG. 5, the fixed bins and associated equipment operate similar to those of FIG. 6, and trolleys and bins can be exclusively or together on the same line to fabricate the laminar web as desired. Specifically utilizing alternating perpendicular and parallel laminations of used board would be desirable for wider web manufacture, as such a criss-cross lamination technique would assure more uniform, more omnidirectional, strength characteristics for the wide web. Many combinations of the described steps and apparatus will be apparent to those of skill in the art in light of the disclosure herein.

Figure 13A:
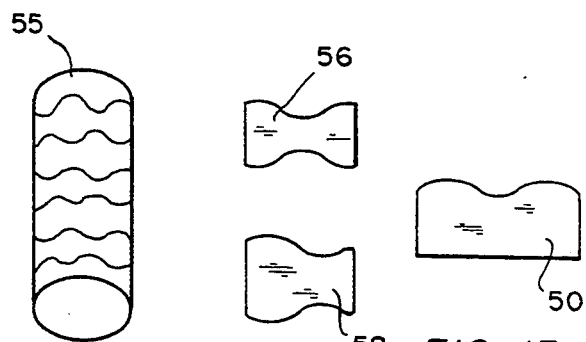
FIG. 13a is an illustration of shaped or tiled interlocking panel components formed by the apparatus of FIG. 13.

FIG. 13 and FIG. 13a illustrate an apparatus 55 for fashioning an interlocking shaped tile or panel 56 from the flattened used corrugated shipping containers 57. A single sheet flattened box 57 is run through a die roller 55 which cuts the sheet into puzzle like interlocking shapes 56, 58, 59. Although a specific "hourglass" shape 56 is illustrated this is for illustrative purposes only. The interlocking tiles or hourglass shapes are sorted so that only complete FIGS. 56 remain and partial FIGS. 58, 59 are discarded. The tiles are then used with the previous described apparatus and process steps to form a laminar web from the interlocking tiles as desired. FIG. 14 illustrates a web assembled from the tiles and trimmed (as further described below) to form a rectangular panel or beam.

Figure 7:
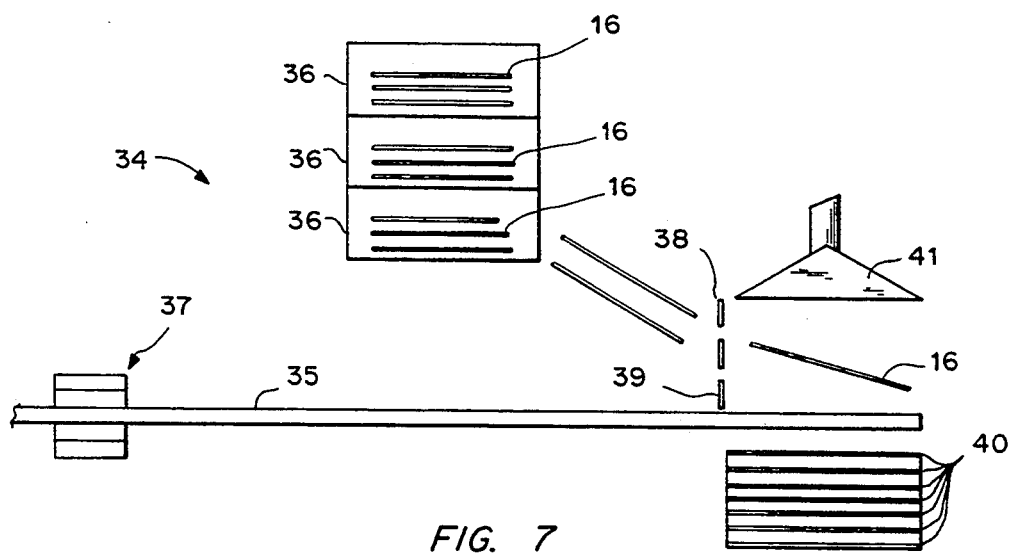
FIG. 7 is an illustration of an apparatus for the step of adjusting the thickened laminar web constructed by the apparatus of FIGS. 5 or 6 to a specified thickness.

FIG. 7 illustrates a final lay station 34 to measure the thickness of the web 35 and adjust if necessary to specification out of multiple bins 36 of varying thickness panels. A thickness sensor 37 provides a reading used to select the appropriate panel to make up the correct product. Sorted panels 16 are stored in the bins 36. Glue guns and dispensing are done as with previous described apparatus of the invention. A shear 38 is provided to trim panel lengths as needed and a shear or cutting device 39 cuts the web into segments of the length desired. Press 41 is provided to achieve the proper bond of the last adjusting layer from this final lay station 34.

Figure 8:
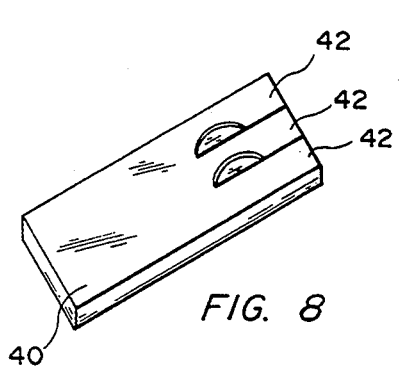
FIG. 8 is an illustration of an apparatus for cutting the continuous laminar web into beams.

After the finished web (or cut web segments) is allowed to cure as previously described, it is slit or sawn to form the height (vertical) dimension of the beam. This can be done as in FIG. 8 with multiple simultaneous cuts. FIG. 8 illustrates a web segment 40 being run through a double bladed saw similar to that described in previous figures to form completed beams 42.

Figure 9:
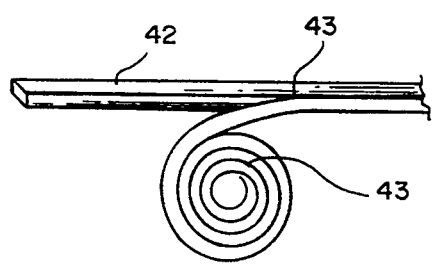
FIG. 9 is an illustration of the step of overwrapping the beams formed by the apparatus of FIG. 8.

An additional step shown in FIG. 9, which would strengthen the beam, would be to wrap the beam in one layer of corrugated with an overlap joint. The exterior of this sheet could be treated to retard moisture absorption if needed for a particular application. Wrapping with a single sheet would provide additional protection against bonding failures within the web and prevent delamination/torsion failures. A further step would be wrapping a sheet of corrugated around a beam that varies in thickness. This is achieved with a wrapping machine which will vary the score lines with the varying thickness of the web.

Testing of each finished beam for deflection against failure is an optional step for quality control, or the thickness of the beam would may be increased over optimum to allow for intermittent weakness.

Figure 10:
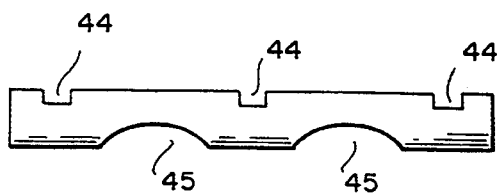
FIG. 10 is a configured structural beam notched for assembly into a pallet.
Figure 11:
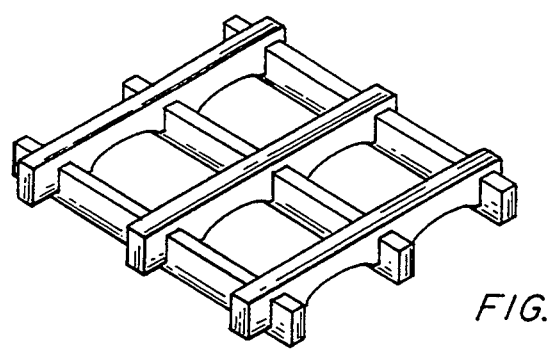
FIG. 11 is a pallet assembled from components manufactured by the apparatus and steps of the previous figures.

The beam 42 is then sawn to length and slotted or dadoed to achieve the finished member with interlock slots and fork clearances. FIG. 10. With close web thickness control, assembly into a finished pallet or equivalent construction as in FIG. 11 will be a simple manual fitting process. However, as web thickness control is lost, assembly is more difficult. Since corrugated can be partially crushed on the sides of the flutes without serious loss of strength, a crushing or fitting mechanism can be used such as a wide blade sheet metal Vice-grip pliers as wide as the slot and set to deform the corrugated only enough to allow for assembly. Alternatively steps of flattening or milling the sidewall of the corrugated as the dadoes are cut can be added. A final alternative would be an assembly ram which would force the beam through a throat of sufficient thickness to allow the beam to be inserted into the constant width dadoed slot.

The foregoing disclosure and description of the invention are illustrative and explanatory thereof, and various changes in size, shape and materials, as well as the details of the illustrated construction and sequence of the steps may be made without departing from the spirit of the invention.

I claim:

1. A process for making a continuous web from recycled corrugated cardboard comprising the steps of:
   (a) improving quality and minimizing variation of pieces of corrugated cardboard for a subsequent manufacturing process by
      (i) cutting said pieces of corrugated cardboard into panels of at least one selected standard width,
      (ii) removing irregularities from said standard width panels to leave a plurality of panels of constant width and varying lengths and thicknesses and
      (iii) sorting said panels by said thickness;
   (b) manufacturing a continuous web from said pieces of corrugated cardboard bonded layer to layer.

2. The invention of claim 1 further comprising the steps of:
   (a) cutting structural components from said web; and,
   (b) configuring said components for assembly.

3. The invention of claim 2 wherein the step of manufacturing said continuous web comprises the steps of:
   (a) flattening said cardboard into panels;
   (b) aligning a first series of panels in end to end engagement in a row;
   (c) applying an adhesive to one face of said panels;
   (d) laying a second series of panels upon said adhesive in end to end engagement one to another and face to face with said first series of panels using an overlapping arrangement wherein panels said second layer overlap said end to end joints of said panels in said first layer to form a laminated composite;
   (e) compressing said composite;
   (f) repeating steps c, d and e until the desired total composite thickness has been reached.

4. The invention of claim 3 wherein each of said layers of panels comprises panels of a single thickness.

5. The invention of claim 3 wherein said pieces are cut into panels of several uniform standard widths.

6. The invention of claim 3 comprising the further step of selecting from the panels of standard width, sorted by thickness, panels within a range of specific thicknesses.

7. The invention of claim 6 comprising the further step of selection from the panels of standard width, sorted by thickness, panels within a range of specific lengths.

8. The invention of claim 3 comprising the further step of selection from the panels of standard width, sorted by thickness, panels within a range of specific lengths.

9. The invention of claim 2 wherein the step of manufacturing said continuous web comprises placing each successive layer of the continuous web perpendicular relative to the previous layer.

10. The invention of claim 1 wherein said continuous web is formed by cutting said panels into interlocking shapes and tiling said panels in interlocking relation to form each said layer of said continuous web.

11. The invention of claim 1 wherein said step of manufacturing comprises the steps of layering said recycled cardboard into a web.

12. The invention of claim 11 wherein the step of cutting further comprises tiling said panels into interlocking shapes.

13. A process for making a continuous web from recycled corrugated cardboard comprising the steps of:
(a) improving quality and minimizing variation of pieces of corrugated cardboard for a subsequent manufacturing process;
(b) manufacturing a continuous web from said pieces of corrugated cardboard bonded layer to layer wherein said step of manufacturing said continuous web includes the steps of
  (i) flattening said cardboard into panels,
  (ii) aligning a first series of panels in end to end engagement in a row,
  (iii) applying an adhesive to one face of said panels,
  (iv) laying a second series of panels upon said adhesive in end to end engagement one to another and face to face with said first series of panels using an overlapping arrangement wherein panels said second layer overlap said end to end joints of said panels in said first layer to form a laminated composite,
  (v) compressing said composite,
  (vi) repeating steps c, d and e until the desired total composite thickness has been reached;
(c) cutting structural components from said web; and,
(d) configuring said components for assembly.

14. A process for making a continuous web from recycled corrugated cardboard comprising the steps of:
(a) improving quality and minimizing variation of pieces of corrugated cardboard for a subsequent manufacturing process;
(b) manufacturing a continuous web from said pieces of corrugated cardboard bonded layer to layer wherein said continuous web is formed by cutting panels from said pieces of corrugated cardboard into interlocking shapes and tiling said panels in interlocking relation to form each said layer of said continuous web;
(c) cutting structural components from said web; and,
(d) configuring said components for assembly.

* * * * *